3,296,250
4-THIAZOLYLMETHYLPENICILLINS
Robert Rowntree Fraser, Syracuse, N.Y., assignor to Bristol-Myers Company, New York, N.Y., a corporation of Delaware
No Drawing. Filed June 8, 1964, Ser. No. 373,560
4 Claims. (Cl. 260—239.1)

This invention relates to new synthetic compounds of value as antibacterial agents, as nutritional supplements in animal feeds, as agents for the treatment of mastitis in cattle and as therapeutic agents in poultry and animals, including man, in the treatment of infectious diseases caused by Gram-positive and Gram-negative bacteria and, more particularly, relates to novel 4-thiazolylmethylpenicillins which may bear certain substituents at the 2-position of the thiazole ring, and non-toxic, pharmaceutically acceptable salts thereof.

Antibacterial agents of the penicillin class have proven highly effective in the therapy of infections due to Gram-positive bacteria but nearly all such penicillins are ineffective against Gram-negative bacteria. It is the object of the present invention to provide novel compounds which are effective against both Gram-negative and Gram-positive bacteria. It is a further object of the present invention to provide such penicillins which are efficiently absorbed upon oral administration to man and animals.

The objects of the present invention have been achieved by the provision, according to the present invention, of a compound selected from the group consisting of an acid of the formula

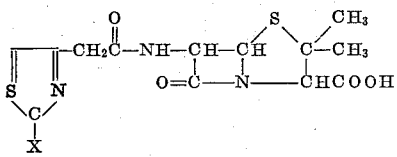

wherein X represents a member selected from the group consisting of hydrogen and (lower)alkyl; and nontoxic, pharmaceutically acceptable salts thereof.

The nontoxic, pharmaceutically acceptable salts include metallic salts such as sodium, potassium, calcium and aluminum, the ammonium salt and substituted ammonium salts, e.g. salts of such nontoxic amines as trialkylamines, including triethylamine, procaine, dibenzylamine, N-benzyl-beta-phenethylamine, 1-ephenamine, N,N-dibenzylethylenediamine, dehydroabietylamine, N, N'-bis-dehydroabietylethylenediamine, N-(lower)-alkylpiperidines, e.g. N-ethylpiperidine, and other amines which have been used to form salts with benzylpenicillin. The term "(lower)alkyl" as used herein means both straight and branched chain aliphatic hydrocarbon radicals having from one to ten carbon atoms such as methyl, ethyl, propyl, isopropyl, butyl, isobutyl, t-butyl, amyl, hexyl, 2-ethylhexyl, heptyl, decyl, etc. Also included within the scope of the present invention are easily hydrolyzed esters and amides which are converted to the free acid form by chemical or enzymatic hydrolysis.

The preferred compounds of the present invention have the formula

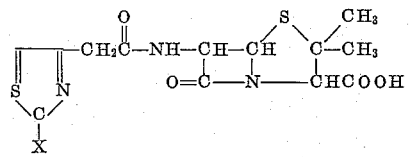

wherein X is hydrogen or methyl.

The products of the present invention are prepared by the reaction of 6-aminopenicillanic acid, preferably in the form of a neutral salt such as the sodium salt or the triethylamine salt, with an acid chloride having the formula

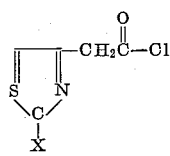

wherein X is hydrogen or (lower)alkyl, or its functional equivalent as an acylating agent for a primary amino group. Such equivalents include the corresponding carboxylic acid bromides, acid anhydrides and mixed anhydrides with other carboxylic acids, including monoesters, and particularly lower aliphatic esters, of carbonic acid. In addition, an acid azide or an active ester or thioester (e.g. with p-nitrophenol, thiophenol, thioacetic acid) may be used or the free acid itself may be coupled with 6-aminopenicillanic acid by the use of enzymes or of a carbodiimide reagent (cf. Sheehan and Hess, J. Amer. Chem. Soc., 77, 1067, (1955)). Another equivalent of the acid chloride is a corresponding azolide, i.e. an amide of the corresponding acid whose amide nitrogen is a member of a quasi-aromatic five-membered ring containing at least two nitrogen atoms, i.e. imidazole, pyrazole, the triazoles, benzimidazole, benzotriazole and their substituted derivatives. As an example of the general method for the preparation of an azolide, N,N'-carbonyldiimidazole is reacted with a carboxylic acid in equimolar proportions at room temperature in tetrahydrofuran, chloroform, dimethylformamide or a similar inert solvent to form the carboxylic acid imidazolide in practically quantitative yield with liberation of carbon dioxide and one mole of imidazole. Dicarboxylic acids yield diimidazolides. The by-product, imidazole, precipitates and may be separated and the imidazolide isolated but this is not essential. The methods for carrying out these reactions to produce a penicillin and the methods used to isolate the penicillins so-produced are well-known in the art.

The thiazole-4-acetic acids used to produce the compounds of the present invention are prepared as exemplified below by condensation of α-bromoacetoacetic ester (J. Org. Chem. 12, 346 (1947)) with thioformamide (see Helv. Chim. Acta, 31, 2071 (1948)) or with a thioalkanoic acid, e.g. thioacetamide (see E. R. H. Jones, J. Chem. Soc. (1946) 90).

Additional general methods of preparation and reactions of thiazole-4-acetic acids are disclosed, for example, on pages 623–634 of volume 5 of Heterocyclic Compounds, R. C. Elderfield, John Wiley and Sons, Inc., New York, 1957 and on pages 386–402 of volume IV, part A, of Chemistry of Carbon Compounds, E. H. Rodd, Elsevier Publishing Company, New York, 1957, and in J. Chem. Soc. (1950) pages 1947–1954 and in the references therein.

The following examples will serve to illustrate this invention without limiting it thereto. All melting points are uncorrected and all temperatures are given in degrees centigrade.

EXAMPLE 1

*Synthesis of thiazole-4-acetic acid and conversion to penicillin*

A solution of ethyl γ-bromoacetoacetate (28.7 g.) in 50 cc. abs. ethanol was treated with a solution of 11 g. thioformamide in 15 cc. alcohol with stirring and cooling below 40° C. Following addition, the solution was heated under reflux for 15 minutes. Then 500 ml. 2 N HCl was added and the mixture washed with ether. The residual aqueous solution was treated with excess $NaHCO_3$ and extracted with ether. The ethereal extracts were dried over $MgSO_4$ and concentrated under vacuum. Distillation of the residue gave 5.5 g. (25%) of a liquid B.P. 138° (28 mm.). This ester was hydrolyzed by stirring for 10 minutes with 10% KOH, then the homogeneous reaction mixture adjusted to pH 2.5 and chilled whereupon thiazole-4-acetic acid formed as a crop of white crystals which were collected by filtration, wt. 3.4 g., M.P. 138–139° C.

A solution of 1.53 g. (10 m.-mole) of this acid was dissolved in 40 ml. dimethylformamide (DMF) and cooled below 0° C. Then 1.07 g. (10 m.-mole) of 2,6-lutidine was added with stirring and then 1.37 g. (10 m.-mole) of isobutylchloroformate. After 15 minutes a solution of 3.17 g. (10 m.-mole) of the triethylamine salt of 6-aminopenicillanic acid (6-APA) in 30 ml. DMF was added and the mixture stirred for 90 minutes at 0° C. The reaction mixture was thrown into 500 ml. water, the pH adjusted to 4.0 and the solution extracted twice with ethyl acetate. The ethyl acetate extracts were dried over magnesium sulfate for 30 minutes, filtered and the filtrate treated with 0.5 g. of potassium 2-ethylhexanoate (KEH) in an equal weight of ether. The potassium 4-thiazolylmethylpenicillin, also called potassium 6-(thiazole-4-acetamido)penicillanate which precipitated was collected by filtration and dried in vacuo. Yield was 600 mg., 16% of theoretical.

*Analysis.*—Calc'd. for $C_{13}H_{14}N_3S_2O_4K$: C, 41.2; H, 3.7; N, 11.1. Found: C, 41.25; H, 4.18; N, 10.85.

This penicillin exhibited minimum inhibitory concentrations (M.I.C.) in vitro versus *S. aureus* Smith of 0.125 mcg./ml., versus *D. pneumoniae* of 0.062–0.125 mcg./ml., versus *Str. pyogenes* of 0.031 mcg./ml., versus *S. typhosa* of 3.1–6.25 mcg./ml., versus *Klebsiella pneumoniae* of 6.25 mcg./ml. and versus *S. enteritidis* of 0.8 mcg./ml. and was found to exhibit by intramuscular injection in mice a $CD_{50}$ of 0.48 mgm./kg. versus *Staph aureus* Smith and a $CD_{50}$ of 5.2 mgm./kg. versus *S. enteritidis*.

EXAMPLE 2

*Synthesis of 2-methylthiazole-4-acetic acid and conversion to penicillin*

A solution of 18 g. of ethyl γ-bromoacetoacetate in 40 ml. absolute ethanol was treated with 6.4 g. of thioacetamide and allowed to stand for 20 hours. The reaction mixture was added to 200 ml. 2 N HCl, extracted with ether and then made alkaline by addition of sodium bicarbonate. The mixture was then extracted twice with ether and the ether extracts dried over sodium sulfate. Distillation of the residue after removal of ether gave 8.0 g. of colorless liquid, B.P. 142–143° C. (24 mm.). Lit. B.P. 127° C. (13 mm.). This liquid ester was thrown into 40 ml. of 10% aqueous KOH and stirred until one phase was present (about 10 min.). The pH was then adjusted to 2.5 with concentrated HCl and the beaker cooled in an ice bath. The crystals which formed were filtered off and dried. A total of 1.7 g. of acid, M.P. 125–126° C., was obtained whose infrared spectrum was consistent with the structure 2-methylthiazole-4-acetic acid (Lit. M.P. 124° C.).

A solution of 1.62 g. (10 m.-mole) of the above 2-methylthiazole-4-acetic acid was dissolved in 40 ml. dimethylformamide (DMF) and cooled below 0° C. Then 1.07 g. (10 m.-mole) of 2,6-lutidine was added with stirring and then 1.37 g. (10 m.-mole) of isobutylchloroformate. After 15 minutes a solution of 3.17 g. (10 m.-mole) of the triethylamine salt of 6-aminopenicillanic acid (6-APA) in 30 ml. DMF was added and the mixture stirred for 90 minutes at 0° C. The reaction mixture was thrown into 500 ml. of water, the pH adjusted to 4.0 and the solution extracted twice with ethyl acetate. The ethyl acetate extracts were dried over magnesium sulfate for 30 minutes, filtered and the filtrate treated with 0.5 g. of potassium 2-ethylhexanoate in an equal weight of ether. Two solid fractions were collected by addition of 100 ml. portions of ether to the solution. The first fraction, wt. 250 mg. was impure product according to its infrared spectrum. The second solid fraction, wt. 570 mg., was the desired potassium 2'-methyl-4-thiazolylmethylpenicillin, also called potassium 6-(2'-methyl-4-thiazolylacetamido)penicillanate.

*Anaylsis.*—Calc'd. for $C_{14}H_{16}N_3O_4S_2K$: C, 42.73; H, 4.10; N, 10.68. Found: C, 42.75; H, 4.57; N, 10.43.

This penicillin exhibited minimum inhibitory concentration (M.I.C.) in vitro versus *S. aureus* Smith of 0.062 mcg./ml., versus *D. pneumoniae* of 0.062 mcg./ml., versus *Str. pyogenes* of 0.016–0.031 mcg./ml., versus *S. typhosa* of 12.5–50.0 mcg./ml., versus *Klebsiella pneumoniae* of 50 mcg./ml. and versus *S. enteritidis* of 3.1–6.25 mcg./ml. and was found to exhibit by intramuscular injection in mice a $CD_{50}$ of 86 mgm./kg. versus *Staph. aureus* Smith and a $CD_{50}$ of 86 mgm./kg. versus *S. enteritidis*.

I claim:

1. A compound selected from the group consisting of an acid of the formula

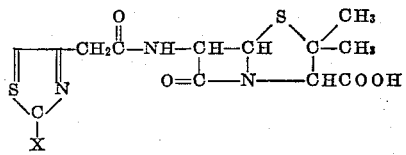

wherein X represents a member selected from the group consisting of hydrogen and (lower)alkyl; and nontoxic, pharmaceutically acceptable salts thereof.

2. A compound of the formula

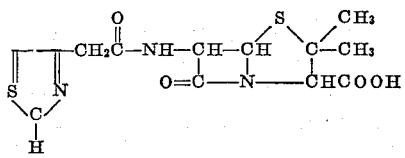

3. A compound of the formula

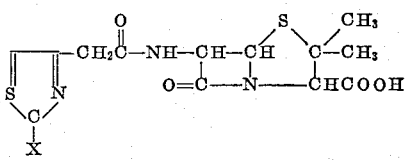

wherein X represents (lower)alkyl.

4. The compound of the formula

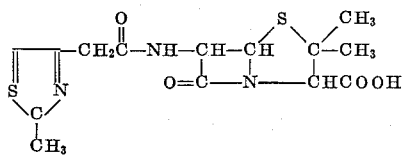

References Cited by the Examiner

UNITED STATES PATENTS

| 3,007,920 | 11/1961 | Vanderhaeghe et al. | 260—239.1 |
| 3,159,617 | 12/1964 | Sheehan | 260—239.1 |
| 3,174,964 | 3/1965 | Hobbs et al. | 260—239.1 |

References Cited by the Applicant

UNITED STATES PATENTS

| 2,941,995 | 6/1960 | Doyle et al. |
| 2,951,839 | 9/1960 | Doyle et al. |

OTHER REFERENCES

Erlenmeyer et al.: Helv. Chim. Acta 31 2071 (1948).
Burger et al.: J. Org. Chem. 12, 346 (1947).
E. R. H. Jones: J. Chem. Soc., 1946, 90.

ALEX MAZEL, *Primary Examiner.*

HENRY R. JILES, *Examiner.*

J. W. ADAMS, JR., *Assistant Examiner.*